United States Patent [19]

Schlegel

[11] 4,333,561

[45] Jun. 8, 1982

[54] ELEVATOR HEAD MATERIAL GUIDE MEANS

[76] Inventor: Hans J. Schlegel, 6129-72nd La. North, Minneapolis, Minn. 55429

[21] Appl. No.: 176,480

[22] Filed: Aug. 8, 1980

Related U.S. Application Data

[63] Continuation of Ser. No. 923,181, Jul. 10, 1978, abandoned.

[51] Int. Cl.³ .................. B65G 17/36; B65G 35/00
[52] U.S. Cl. .................................. 198/703; 198/713
[58] Field of Search .............. 198/714, 703, 640, 641, 198/713, 836, 716; 239/666

[56] References Cited

U.S. PATENT DOCUMENTS

| | | |
|---|---|---|
| 196,348 | 10/1877 | Gallaher . |
| 222,137 | 12/1879 | Imhorst . |
| 393,762 | 12/1888 | Jarret et al. . |
| 466,571 | 1/1892 | Miller . |
| 675,815 | 6/1901 | Clarke . |
| 688,684 | 12/1901 | Piez . |
| 1,204,949 | 11/1916 | Cottrell . |
| 2,084,920 | 6/1937 | Schrag . |
| 2,272,429 | 2/1942 | Philbrick . |
| 2,318,881 | 5/1943 | Mundy . |
| 3,247,951 | 4/1966 | Cochran . |
| 3,687,272 | 8/1972 | Eisenegger ................ 198/168 |

FOREIGN PATENT DOCUMENTS 1781450 10/1973 Fed. Rep. of Germany .
51436 11/1941 Netherlands .

Primary Examiner—Robert B. Reeves
Assistant Examiner—Brian Bond
Attorney, Agent, or Firm—Burd, Bartz & Gutenkauf

[57] ABSTRACT

An elevator having a bucket conveyor for moving material, as grain, from a hopper to a discharge location. The conveyor has an endless belt trained about idler and drive pulleys. A plurality of cups secured to the belt carry columns of material from the hopper to the head of the elevator. The cups include a plurality of open bottom cups and a closed bottom cup located below a column of open bottom cups to carry a column of grain. An arcuate curved material guide element is located adjacent the cups moving around the drive pulley at the upper end of the elevator to retain material in the cups as they move around the drive pulley. The guide element is a curved baffle that is adjustably mounted on the elevator head housing allowing the position of the baffle relative to the outer lips of the cup to be adjusted to retain the material in the cups as the cups move over the head pulley and to control the discharge of the material from the cups.

15 Claims, 10 Drawing Figures

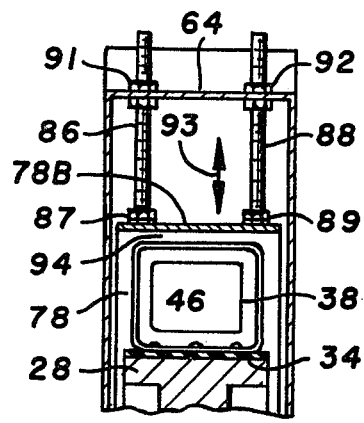
FIG. 7
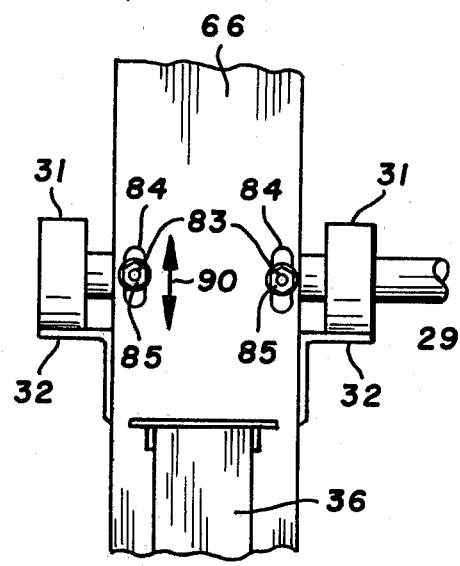
FIG. 8
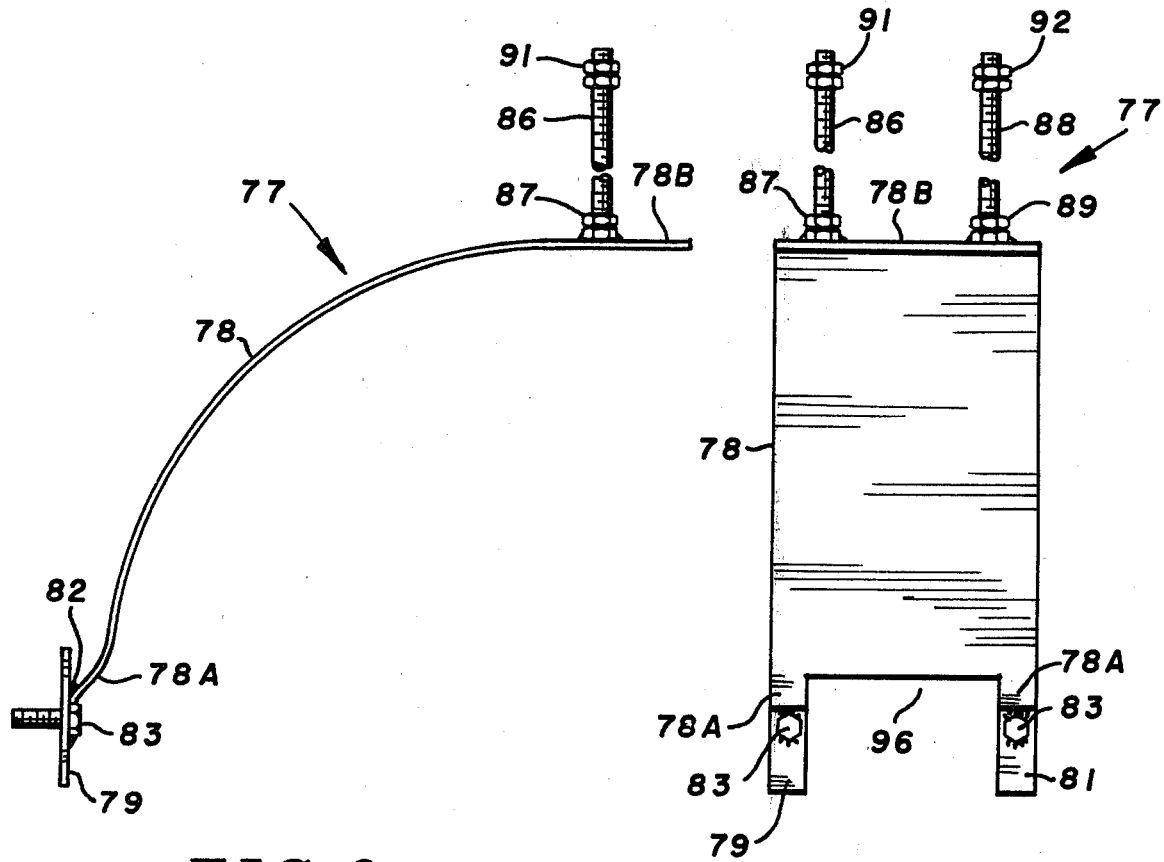
FIG. 9
FIG. 10

ELEVATOR HEAD MATERIAL GUIDE MEANS

This application is a continuation of U.S. application Ser. No. 923,181, filed July 10, 1978, now abandoned.

BACKGROUND OF INVENTION

Bucket elevators and conveyors have been used to move material, as water, grain, earth, and the like. These elevators include the type which have an endless belt trained about a pair of spaced pulleys. A plurality of buckets or scoops attached to the belt carry the material along the belt to a discharge location.

In use, the bucket type elevators experience a considerable amount of spilling and backlegging. The spilling occurs when the buckets move around the upper pulley at the discharge end of the elevator. The premature discharge of material is due to the increase in the distance between the outer portions or lips adjacent buckets as the buckets move over the discharge pulley. During this movement there is a jerk due to centrifugal force which causes the material to move outwardly out of the buckets and fall back into the elevator casings, rather than the desired material discharge location.

SUMMARY OF INVENTION

The invention is directed to a material conveyor, such as an elevator for moving grain from a hopper to a discharge location. The conveyor has an endless conveying means comprising an endless belt trained about an idler pulley and a drive pulley. A plurality of cups mounted on the outside of the belt carry material to a discharge head located adjacent the upper end of the conveyor and drive pulley. The cups are arranged in series or groups. Each group has a plurality of open bottom cups and a closed bottom cup. The open bottom cups are located in a stacked or column relationship above the closed bottom cup and are secured to the endless flexible belt to carry a column of material.

A material guide means is adjustably mounted on the head housing for retaining the material in the cups as the cups move around the drive pulley and for directing the material discharged from the cups to a discharge location, such as a funnel having a discharge opening. The material guide means comprises an arcuate baffle or plate having a first end secured to the head housing adjacent the side of the cups generally along a horizontal plane passing through the axis of rotation of the drive pulley. A second adjusting means mounts the discharge end of the baffle on the head housing along a line generally parallel to a vertical plane of the axis of rotation of the head or drive pulley. The position of the baffle relative to the outer lips of the cups can be adjusted to retain the material in the cups as the cups move over the head pulley. The second adjusting means also adjusts the discharge angle of the discharge portion of the baffle, whereby the direction of the material discharged by the cups is controlled.

The elevator having the cups structure and material guide baffle can be operated at relatively high speeds providing the elevator with increased operating capacity. The baffle is adjusted to release the material at the most effective discharge point and prevent the undesirable backlegging and raining of material. The baffle is versatile in use, as it can be used with numerous types of conveyors to control the material in the cups as the cups move over the discharge pulley.

IN THE DRAWINGS

FIG. 7 is an enlarged sectional view taken along the line 7—7 of FIG. 6;

FIG. 8 is an enlarged sectional view taken along the line 8—8 of FIG. 6;

FIG. 9 is a side elevational view of the material guide means; and

FIG. 10 is a front elevational view of the material guide means of FIG. 9.

DESCRIPTION OF PREFERRED EMBODIMENT

Figures 1, 2:
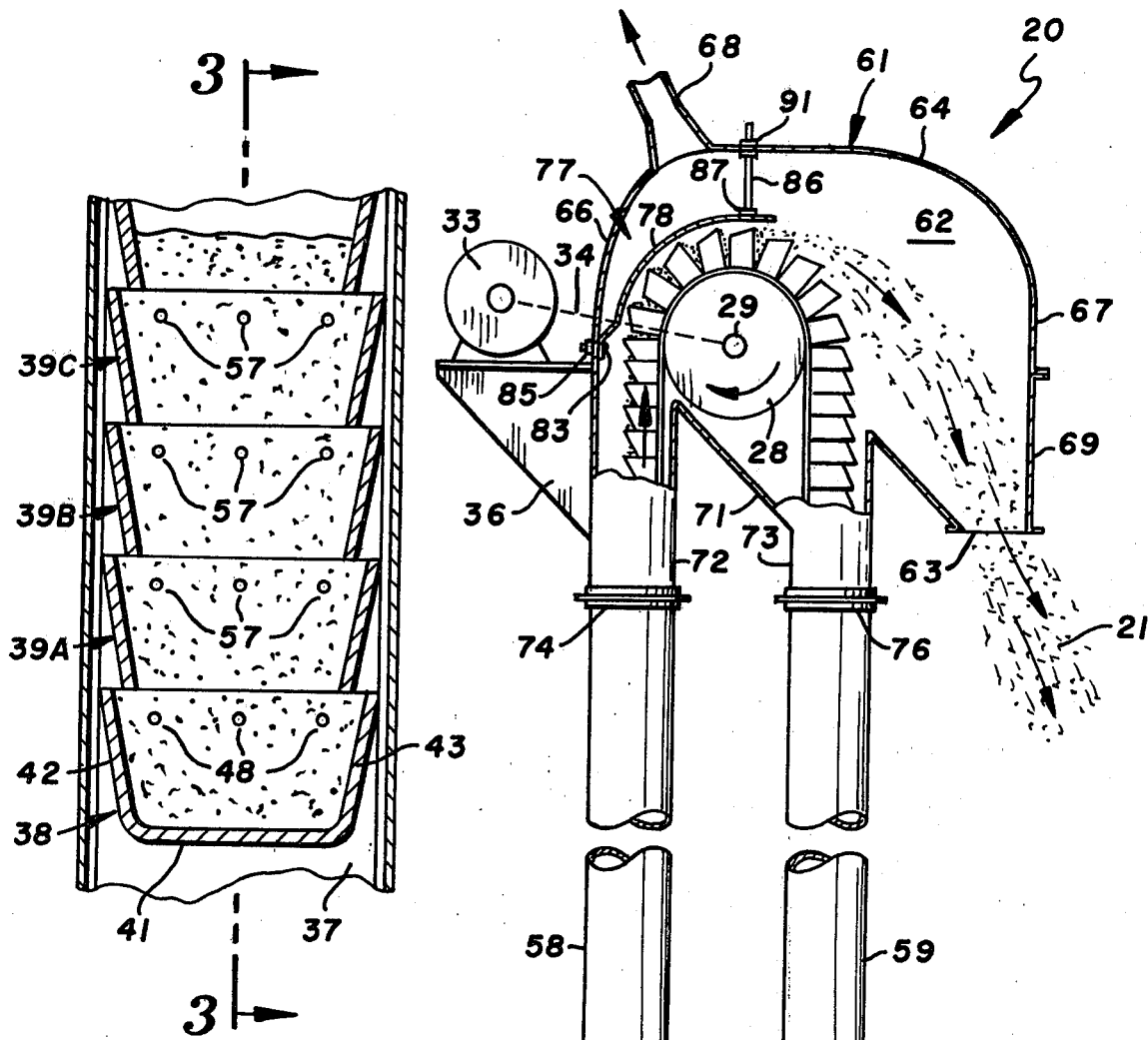
FIG. 1 is a foreshortened elevational view, partly sectioned, of a material handling conveyor equipped with the material guide means of the invention.
FIG. 2 is an enlarged sectional view taken along the line 2—2 of FIG. 1.

Referring to FIG. 1, there is shown the material handling apparatus indicated generally at 20 as a conveyor or elevator for moving material 21, such as grain and similar particulate materials, from a lower location to a higher location. Other types of materials can be handled with apparatus 20. The lower location includes a downwardly extended hopper 22 for receiving material 21 from a supply, such as a conveyor or material hauling vehicle. The top of hopper 21 carries an open grate or door 23 which allows the material to flow into hopper 22. Material 21 is removed from hopper 22 with an endless belt-type conveyor assembly indicated generally at 24.

Conveyor assembly 24 has an idler or base wheel or pulley 26 mounted on a transverse shaft 27 located in the lower portion of hopper 22. Suitable bearings (not shown) mount the opposite ends of shaft 27 to support structure. The upper end of conveyor assembly 24 has a drive or head pulley or wheel 28 secured to a transverse drive shaft 29. Pulleys 26 and 28 are rotatable means having circular rims with cylindrical outer surfaces. As shown in FIG. 7, the rim of pulley 28 has a width that extends the major portion of the distance between the side walls of head housing 64.

As shown in FIG. 8, shaft 29 is rotatably mounted on a pair of bearings 31. Support brackets 32 mount bearings 31 in fixed positions. Shaft 29 is drivably connected to a power unit 33, shown as an electric motor, with a drive 34, as a belt or endless chain. Power unit 33 can be a hydraulic motor, air motor, internal combustion engine, or like power sources. Motor 33 is secured to a support frame 36. An endless flat belt 37 is trained about pulleys 26 and 28. Belt 37 is made of endless flexible material, such as rubber or rubber-like material. Belt 37 has a width substantially the same width as pulleys 26 and 28.

Figure 5:
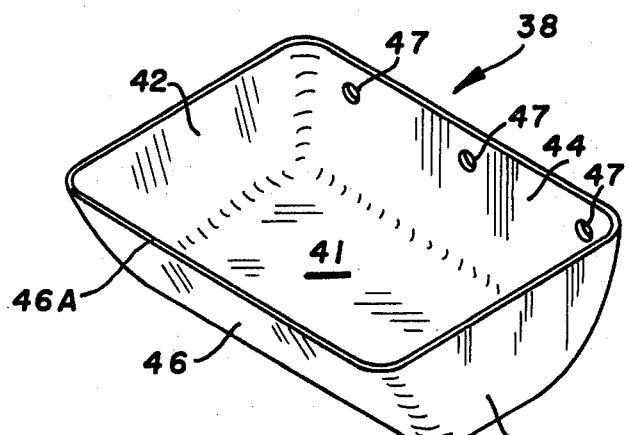
FIG. 5 is a perspective view of a closed bottom cup of the conveyor of FIG. 1.

A plurality of groups or series of cup-type members or cups are secured to the outside of belt 37. Each group of cups has a first closed bottom cup 38 and a plurality of second open bottom cups 39 A-D. First cup 38, shown in FIGS. 2, 3, and 5, comprises a generally cup-shaped member having a closed bottom wall 41, upright outwardly extended side walls 42 and 43, an upright back wall 44, and an outwardly and forwardly sloping front wall 46 terminating in a transverse lip or edge 46A. Back wall 44 has three holes 47 accommodating fasteners, such as bolts or rivets 48, for attaching cup 38 to belt 37. Cups 38 extend laterally from the outside surface of belt 37.

Figure 3:
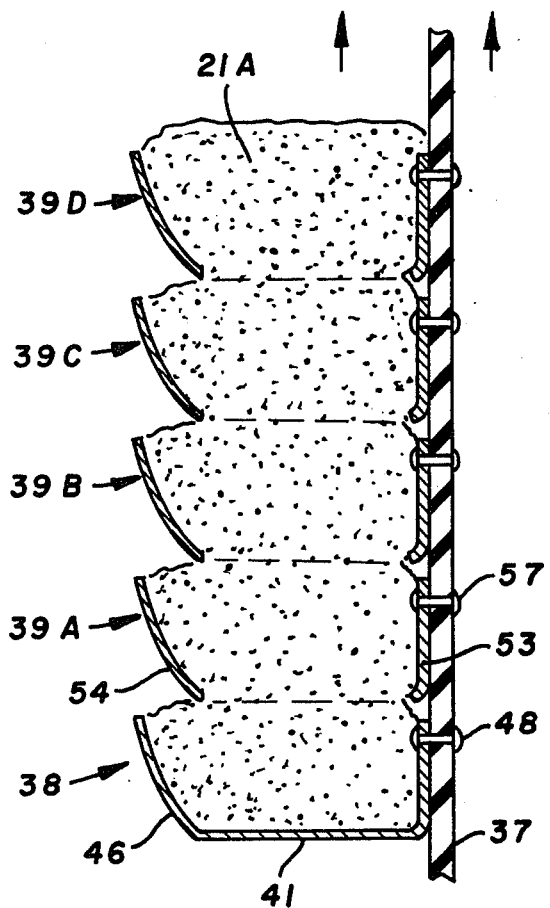
FIG. 3 is a sectional view taken along the line 3—3 of FIG. 2.
Figure 4:
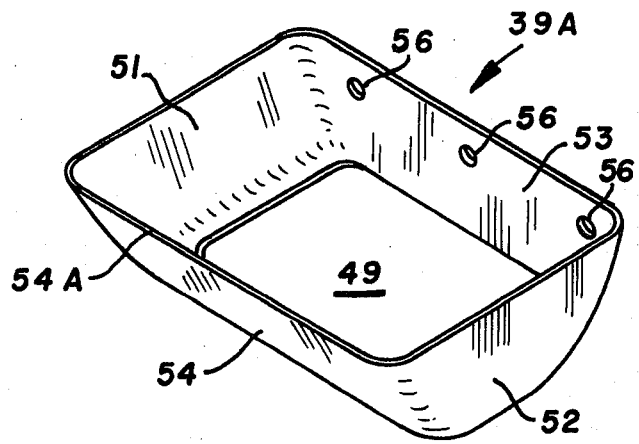
FIG. 4 is a perspective view of an open bottom cup of the conveyor of FIG. 1.

Second cups 39 A-D are located in a stacked or column relationship above a first cup 38. The bottom edge of cup 39A is located along a plane that is above the plane along the top edge of cup 38. Adjacent cups 39A, 39B, 39C, and 39D are spaced from each other along the length of belt 37. As shown in FIGS. 2, 3, and 4, second cups 39A, 39B, 39C, and 39D are identical in structure. The following description is limited to second cup 39A. Cup 39A has an open bottom 49 located above the open top of cup 38. Cup 39A has upwardly directed side walls 51 and 52, a back wall 53 located adjacent the outside surface of belt 37. An upwardly and outwardly directed front wall 54 is secured to the forward portions of side walls 51 and 52. The back wall 53 has three holes 56 accommodating fasteners 57, as rivets, bolts, and the like, to secure cup 39A to the belt 37 above first cup 38.

An example of cups 38 and 39A is as follows. Other sizes and shapes can be used for cups 38 and 39A. Cup 38 has a rectangular top having a width of 6 inches (15.2 cm) and a length of 9 inches (23 cm) and a depth of $3\frac{1}{4}$ inches (8.25 cm). The bottom 41 has a flat section having a width of 3 inches (7.6 cm) and a length of 4 inches (10.1 cm). The side walls 42 and 43 have an outwardly convex curvature and join with a flat inclined front wall 46 and flat upright back wall 44. Wall 46 extends at an angle of about 40 degrees from the plane of bottom 41. Front wall 46 terminates in a linear lip 46A joined to the top edges of side walls 42 and 43. The entire cup is made from a single sheet of metal.

Cup 39A has the same rectangular top as cup 38. The side walls 51 and 52 have convex curvatures and join with back wall 53 and front wall 54. The bottom is open with an opening 49 having a width of $4\frac{1}{4}$ inches (10.8 cm) and a length of $5\frac{3}{4}$ inches (14.6 cm). The front wall 54 has an arcuate or convex curvature and extends at an angle of about 60 degrees from the plane of the bottom edge of cup 39A. The upper edge of wall 54 terminates in a linear lip 54A. The front wall 54 has a greater incline than front wall 46 of cup 38.

As shown in FIG. 3, a column of material 21A is located in the first and second cups 38 and 39 A-D. First cup 38 supports the entire column of material. Second cups 39 A-D maintain the column of material in a vertical relation above first cup 38. The endless belt conveyor 24 has a plurality of groups of first and second cups. First cup 38 is located between 8-10 second cups 39 A-H so that conveyor assembly 24 carries a plurality of columns of material. Other numbers of cups 39A can be used with a closed bottom cup 38 so that the material columns can be longer or shorter.

The elevating and return runs of belt conveyor assembly 24 are located in upright tubular housings or casings 58 and 59, respectively. Casing 58 has an elongated upright passage 58A for accommodating the elevating run of conveyor assembly 24. Casing 59 has a similar elongated passage 59A for accommodating the return run of conveyor assembly 24. The casings 58 and 59 are attached to lower portions of a head housing indicated generally at 61. Housing 61 has a discharge chamber 62 having a bottom discharge opening 63. The material carried by conveyor assembly 24 is discharged into chamber 62 and flows from chamber 62 to a desired location through discharge opening 63. The material can flow to a storage bin or a second conveyor which moves the material to a desired location. The material may be loaded on a vehicle for transport to another location.

Housing 61 has a top wall 64 connected to downwardly directed side walls 66 and 67. A tubular extension or nipple 68 is connected to top wall 64. The tubular extension 68 is coupled to an air evacuation system which carries the fine dust and particulates from chamber 62. A downwardly open funnel 69 is attached to side wall 67. The lower part of funnel 69 has a discharge opening 63. A downwardly sloping bottom wall 71 located below head pulley 28 is connected to downwardly directed tubular portions 72 and 73 accommodating parts of conveyor 24. A first annular connector 74 connects the upper end of tubular member 58 to tubular portion 72. In a similar manner, a second annular connector 76 connects tubular member 59 to tubular portion 73.

In the operation of conveyor assembly 24, motor 33 rotates head pulley 28. This moves the belt and cups attached thereto through the passages of tubular members 58 and 59. The cups 38 and 39 moving around idler pulley 26 pick up material 21 in hopper 22. The elevating or upwardly moving run of conveyor assembly 24 carries columns of material in cups 38 and 39 A-D in an upward direction. As the belt 37 and cups 38 and 39 move over head pulley 28, the material is discharged into chamber 62 and directed by funnel 69 to discharge opening 63.

A material guide means indicated generally at 77 is located adjacent the top portion of the first and second cups 38 and 39 as the cups move over head pulley 28. Material guide means 77 is operable to prevent premature discharge of material from the elevator cups 38 and 39. The premature discharge of material happens because the distance between the adjacent lips 46A and 54A of the cups 38 and 39 increases as the cups move with the belt around head pulley 28. The cups 38 and 39 are moving in a straight upward movement in casing 58. As the cups 38 and 39 move in a circumferential path with pulley 28, there is a slight jerk due to centrifugal force. This is enough force to discharge material from the cups. On high capacity elevator cups, this discharge leads to spilling and backlegging. Material guide means 77 overcomes the spilling and the backlegging problems of the prior art bucket-type elevators.

Referring to FIGS. 9 and 10, material guide means 77 has an elongated arcuately curved baffle or plate 78. Baffle 78 is a flexible curved sheet member having an arcuate length extending through an arc of about 90 degrees. The lower or inlet portion of baffle 78 has a pair of downwardly directed outwardly curved legs 78A attached to upright flat back plates 79 and 81 by welds at 82. Plates 79 and 81 have center holes for accommodating bolts 83. The heads of bolts 83 are secured by welds to plates 79 and 81. Baffle 78 has a discharge end portion 78B projected in a horizontal direction to guide material toward chamber 62. Discharge end portion 78B projects in a horizontal direction parallel to a horizontal tangent line extended from the top of pulley 28. Preferably the portion 78B projects about 4 inches (10.2 cm) beyond a vertical line passing through the axis of rotation of pulley 28.

Figure 6:
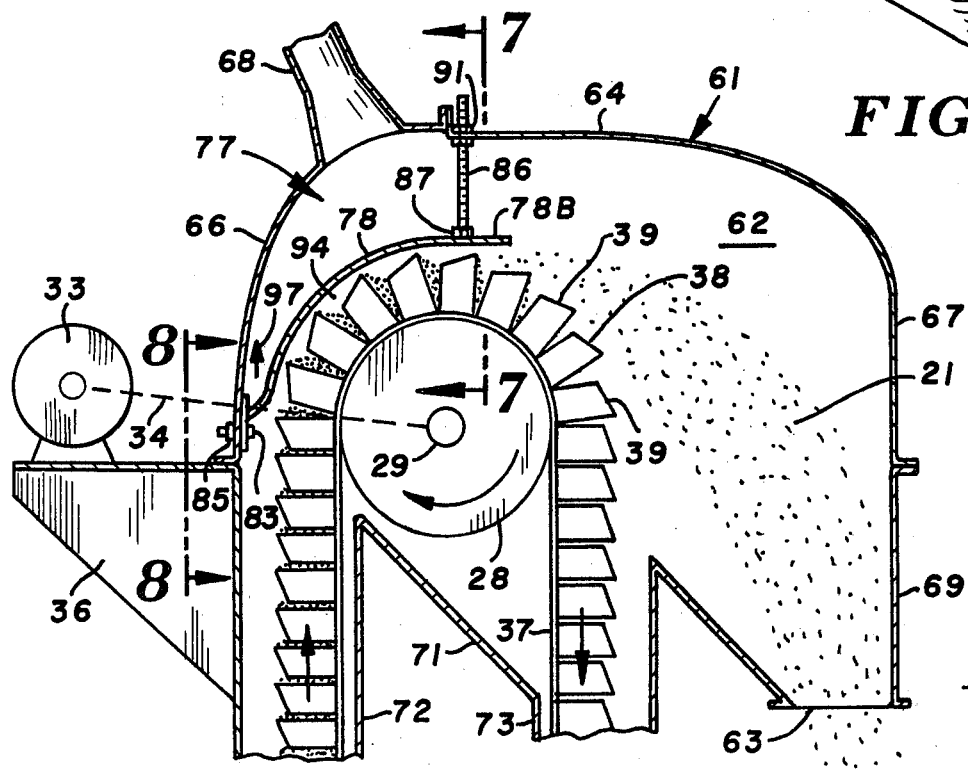
FIG. 6 is a vertical sectional view of the discharge end of the conveyor of FIG. 1 equipped with the material guide means of the invention.

As shown in FIG. 8, bolts 83 extend through elongated slots 84 in housing side wall 66. Nuts 85 threaded on bolts 83 clamp plates 79 and 81 against the inside of side wall 66. The slots 84 permit vertical adjustment of baffle 78 on side wall 66, as indicated by arrow 90. Legs 78A space the leading or lower edge of baffle 78 from side wall 66 providing a rectangular opening 96. Air, dust, dirt, and air-borne particulates flow upwardly in casing 58, through opening 96 to the space above baffle 78 shown by arrow 97 in FIG. 6. The air evacuation system connected to tubular extension 68 removes the air and particulates from the space above baffle 78.

A pair of upright bolts 86 and 88 are secured to the discharge end portion 78B of baffle 78. Bolt 86 is threaded into a pair of nuts 87 secured to the top of discharge end section 78B of baffle 78. Bolt 88 is threaded into a pair of nuts 89 secured to the top of end section 78B. As shown in FIG. 7, bolts 86 and 88 space end section 78B from top wall 64 of housing 61. Nuts 91 adjustably mount bolt 86 on top wall 74. In a similar manner nuts 92 adjustably mount bolt 88 on top wall 64. Bolts 91 and 92 are releasable to allow for the adjustment of space 94 between the inside of baffle 78 and the outer lips 46A and 54A of the cups 38 and 39 A–D. Space 94 is relatively small being about ⅝ inch (1.6 cm). The direction of the adjustment is indicated by the arrow 93 in FIG. 7.

The baffle 77 is a material guide element or displacement body located in the chamber formed by head housing 61 at the backside or belt upcoming side of head pulley 28. Baffle 77 is at a location between 270 degrees and 0 degrees, clockwise in FIGS. 1 and 6, or at a 9 to 12 o'clock location, adjacent the arcuate path of movement of cup lips 46A and 54A as the cups 46 and 54 move around head pulley 28. The inlet portion of baffle 77 is located along a vertical line that is parallel to a vertical tangent line of head pulley 28. The outlet portion 78B of baffle 77 is located along a horizontal line that is parallel to a horizontal tangent of the top of head pulley 20.

In use, motor 33 is operated to rotate head pulley 28. Pulley 28 moves conveyor assembly 24 through the tubular housings 58 and 59 and around bottom pulley 26 located in hopper 22. The cups 38 and 39 A–D moving through the hopper 22 pick up the material and carry the material in a column up tubular member 58. Baffle 78 is located within the elevator head adjacent the upward quadrant of conveyor assembly 24 as it moves over head pulley 28. Baffle 78 has an arcuate inside surface that is located in close proximity or contiguous relationship to the outer lips 46A and 54A of cups 38 and 39. The baffle has a width wider than the transverse dimension or length of cups 38 and 39 A–D, as shown in FIG. 7. The material in the cups 38 and 39 A–D is retained in the vicinity of the cups as portions of the material in the cups are moved out into engagement with baffle 78 as the cups move over head pulley 28. The material is discharged into the discharge chamber 62 and falls into the funnel 69. The material flows from funnel 69 through the discharge opening 63 to the desired location.

Baffle 78 is adjustably mounted on housing 61 to control the space or clearance 94 between the baffle 78 and the outer lips 46A and 54A of cups 38 and 39 A–D. The adjustment permits baffle 78 to be used with different types of head pulleys, and cups, as well as with varying speeds of the conveyor assembly.

While there have been shown and described the preferred embodiments of the conveyor assembly and material guide means, it is understood that changes in the size, shape, and structure can be made by those skilled in the art without departing from the invention. For example, baffle 78 can have a tangential extension extended vertically in a downward direction from the loading end of the baffle adjacent the legs 78A. Also, a tangential extension can be added to the end 78B. The baffle 78 can be provided with downwardly directed side flanges along the opposite sides of the baffle. This provides the baffle with a generally inverted U-shaped cross section. This type of baffle can be used in installations where the elevator head has an extreme width in relation to the width of the head pulley. Other types of baffle adjusting structures can be used to mount the baffle on the head housing. The adjusting structures can provide the baffle with both vertical and horizontal adjustment relative to the cups of the conveyor assembly. The invention is defined in the following claims.

The embodiments of the invention in which an exclusive property or privilege is claimed are defined as follows:

1. In a conveyor for moving material including endless moving belt means having a plurality of cooperatively associated cups thereon for receiving and carrying material as said endless belt moves between spaced pulleys and discharging material as said cups pass around one of said pulleys, a housing generally enclosing said endless belt means, and an arcuate baffle to aid in retaining material in said cups as the latter pass around said one pulley prior to material discharge, said baffle having a configuration substantially complementary to the arcuate path of said cups about said one pulley and having an entry end adjacent arriving cups and an exit end remote therefrom, the improvement comprising: means mounting said baffle to said housing in fixed relation to space said entry end of said baffle from said housing thereby to define an opening between said baffle and said housing into which moving air and dust can flow and be diverted from proximity to said cups as they move about said one pulley to minimize air turbulence thereat prior to discharging material from said cups, said means mounting said baffle to said housing being adjustable thereby to permit mounting of said baffle in a selected fixed position whereby air flows between said baffle and said housing away from said cups may be regulated as desired, said means mounting said baffle to said housing includes a pair of laterally spaced legs secured to the entry end of the baffle, and means securing said legs to said housing, said opening being disposed between said legs.

2. The conveyor of claim 1 wherein: said housing has an exit passage therefrom permitting removal of diverted air and dust from said housing.

3. The conveyor of claim 1 wherein: said exit end of said baffle is mounted to said housing in fixed spaced relation thereto, and adjustment means for selectively adjusting the fixed spaced position of said exit end of said baffle relative to said housing and said cups, said adjustment means comprises a threaded bolt extending between said housing and said baffle exit end, and nuts threadably associated with said bolts and said housing to adjust the spaced position of said baffle exit end.

4. The conveyor of claim 1 wherein: said cups comprise first and second groups of cups, said first group of cups with respect to a vertical run of said endless belt means having upwardly and outwardly inclined outer and side walls and a closed bottom wall, and said second group of cups having similar outer and side walls and bottom openings, a plurality of said second group of cups being located in column relationship above a said first group cup.

5. The conveyor of claim 1 wherein: said exit end of said baffle is mounted to said housing in a fixed spaced position thereto, and means for selectively adjusting the fixed spaced position of said exit end of said baffle relative to said housing and said cups.

6. The conveyor of claim 1 wherein: said means securing said legs to said housing is adjustable thereby to permit mounting of said baffle in a selected fixed position whereby air flow between said baffle and said housing away from said cups may be regulated as desired.

7. In a conveyor for moving material including endless moving belt means having a plurality of cooperatively associated cups thereon for receiving and carrying material as said endless belt moves in a substantially linear path beween spaced pulleys and discharging material as said cups pass around one of said pulleys, a housing generally enclosing said endless belt means, said housing having an outer wall adjacent the material discharge end of the conveyor, and a arcuate baffle to aid in retaining material in said cups as the latter pass around said one pulley prior to material discharge, said baffle having a configuration substantially complementary to the arcuate path of said cups about said one pulley and having an entry end adjacent arriving cups and an exit end remote therefrom, the improvement comprising: means mounting said baffle to said outer wall of the housing in fixed relation to space said entry end of said baffle from said outer wall of the housing thereby to define an opening between said baffle and said outer wall of the housing facing said linear path into which moving air and dust adjacent said endless belt can flow and be delivered from proximity to said cups as they move about said one pulley to minimize air turbulence thereat prior to discharging material from said cups.

8. The conveyor of claim 7 wherein: said means mounting said baffle to said outer wall of the housing is adjustable thereby to permit mounting of said baffle in a selected fixed position whereby air flow between said baffle and said outer wall of the housing away from said cups may be regulated as desired.

9. The conveyor of claims 7 or 8 wherein: said exit end of said baffle is mounted to said housing in fixed spaced relation thereto, and means for selectively adjusting the fixed spaced position thereof relative to said housing and said cups.

10. The conveyor of claim 7 wherein: said means mounting said baffle to said outer wall of said housing includes first means secured to the baffle entry end spacing said baffle entry end from the housing, means securing said first means to the housing, and second means secured to said baffle exit end and housing locating the baffle exit end in fixed spaced relation thereto.

11. The conveyor of claim 10 wherein: said first means includes a plurality of spaced legs, said opening being disposed between said legs.

12. The conveyor of claim 10 wherein: said second means includes adjustment means for selectively adjusting the fixed spaced relation of the baffle exit end relative to the housing and said cups.

13. The conveyor of claim 12 wherein: said adjustment means comprises a threaded bolt means extended between said housing and said baffle exit end, and nuts threadably associated with said bolt means and said housing to adjust the spaced position of said baffle exit end.

14. The conveyor of claim 7 wherein: said outer wall of the housing has an exit passage therefrom permitting removal of diverted air and dust from said housing.

15. The conveyor of claim 7 wherein: said cups comprise first and second groups of cups, said first group of cups with respect to a vertical run of said endless belt means having upwardly and outwardly inclined outer and side walls and a closed bottom, and said second group of cups having similar outer and side walls and bottom openings, a plurality of said second group of cups being located in column relationship above a said first group cup.

* * * * *